Feb. 5, 1935.    A. N. BROWN    1,990,112
GIN SAW GUMMING AND FILING MACHINE
Filed Sept. 5, 1933    4 Sheets-Sheet 1
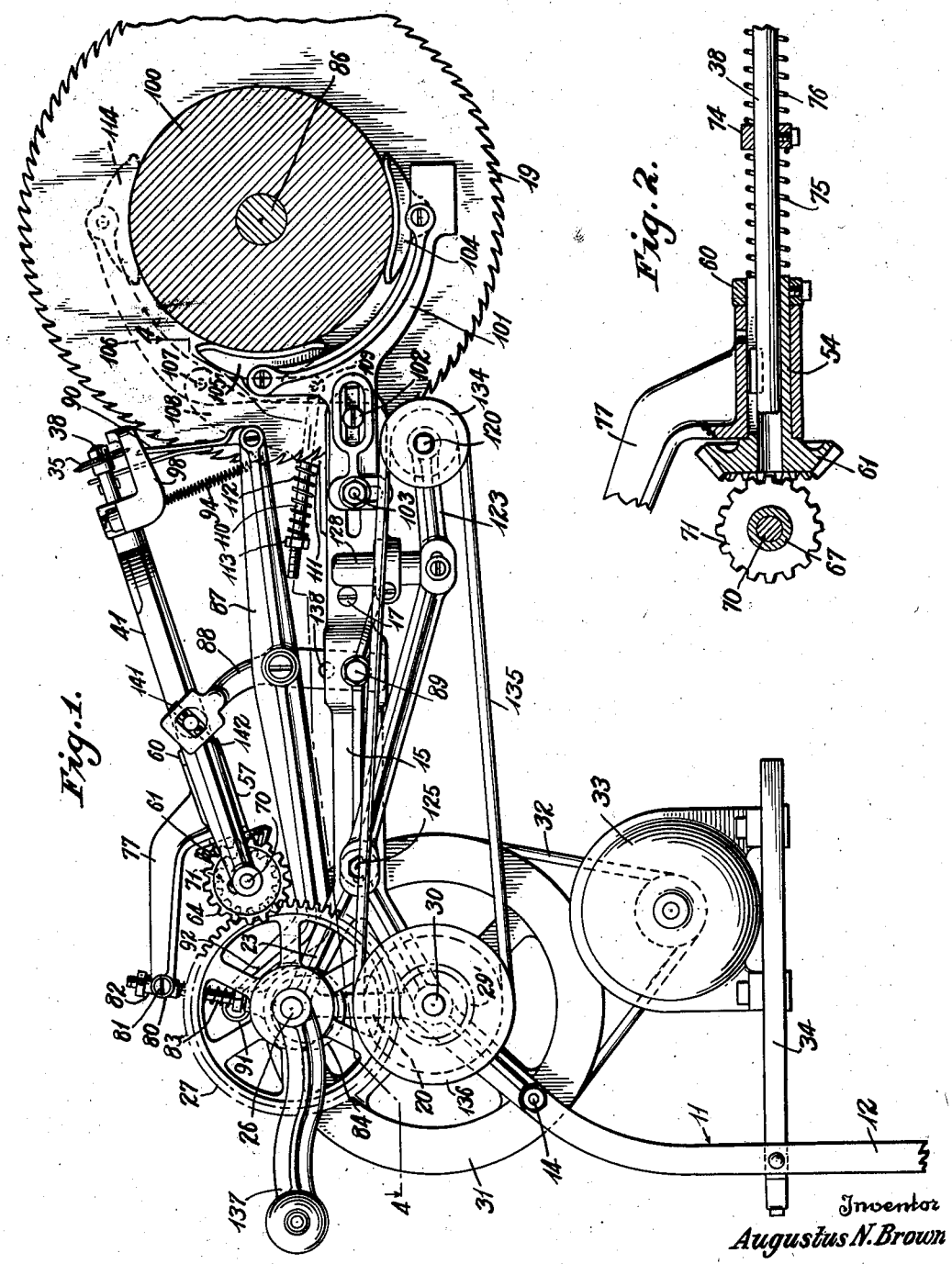
Inventor
Augustus N. Brown
By Browne & Phelps
Attorneys

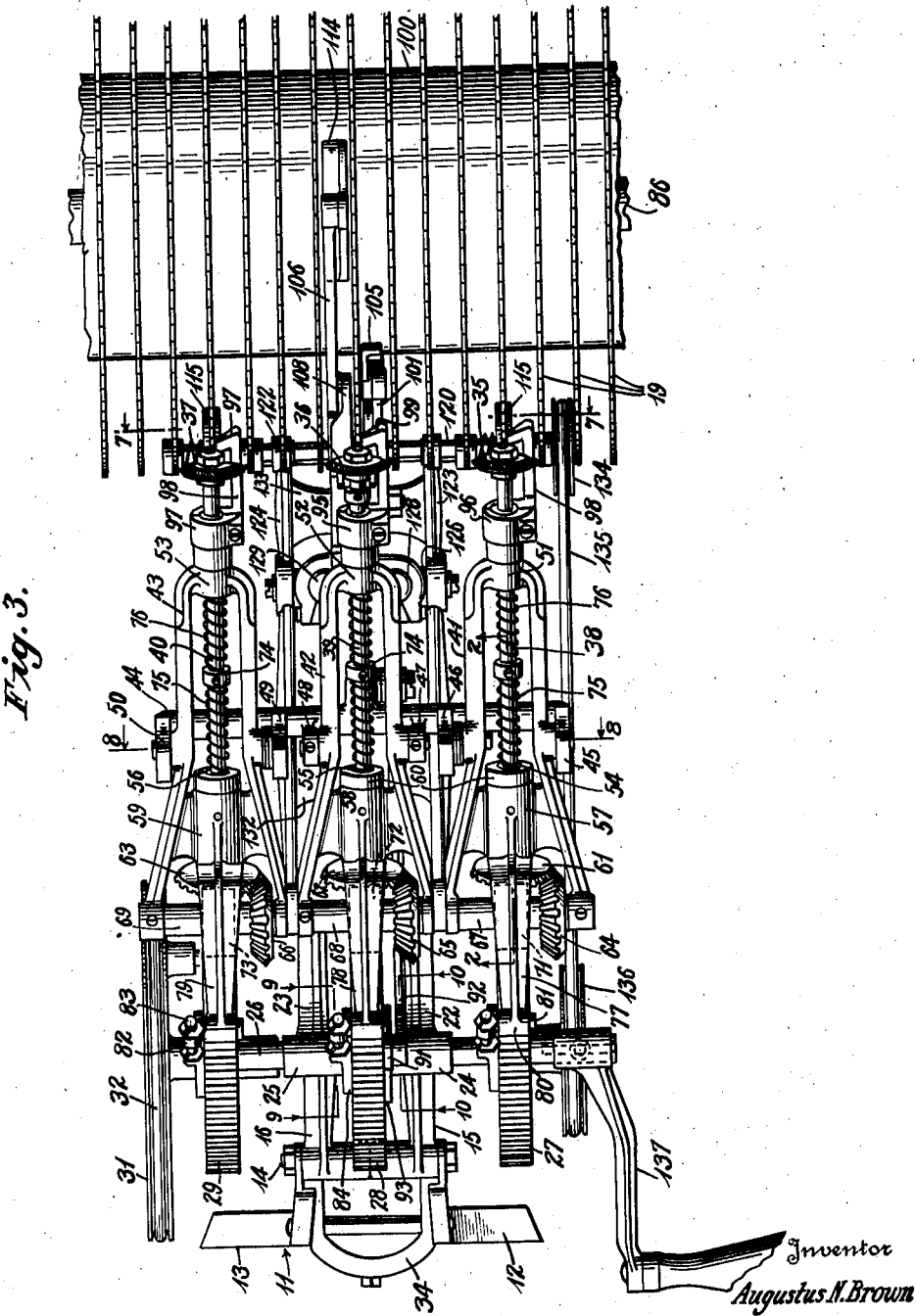

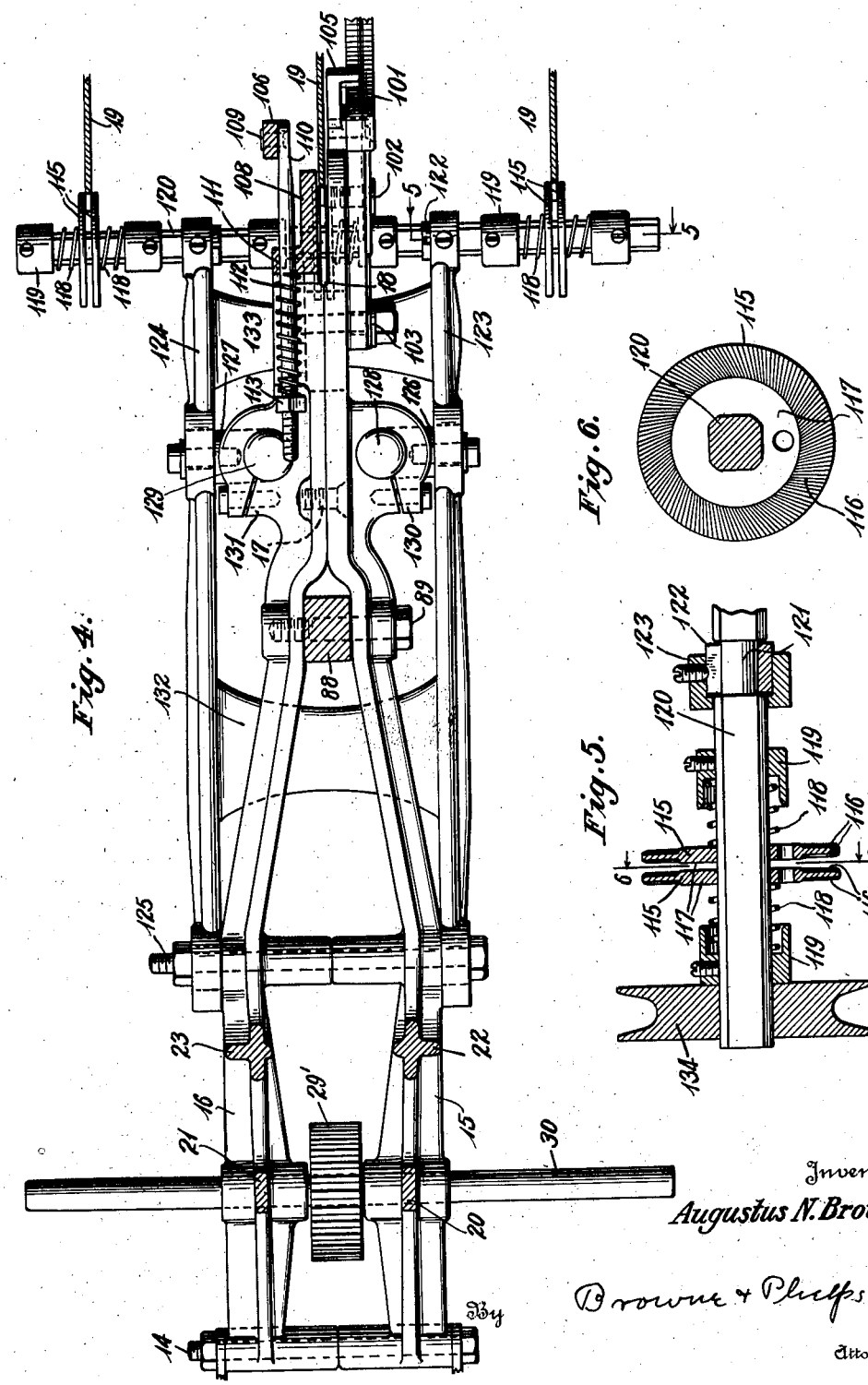

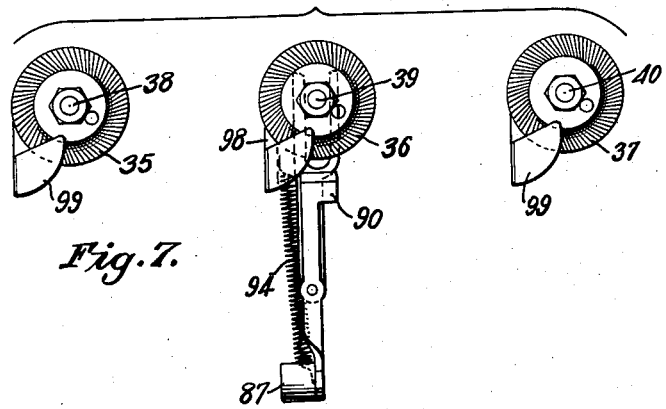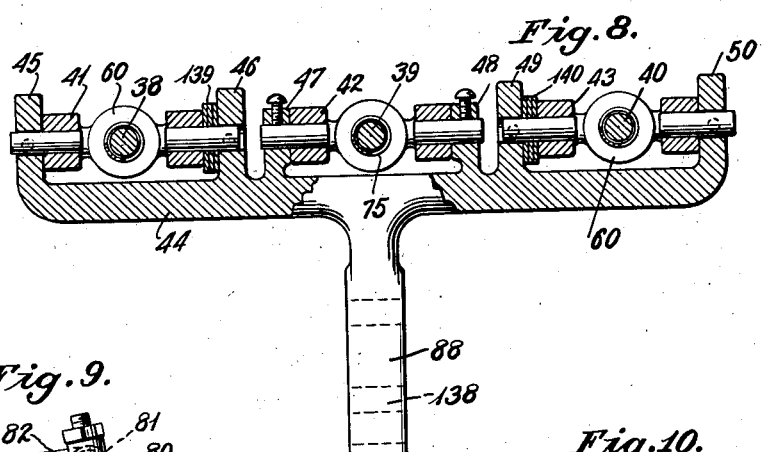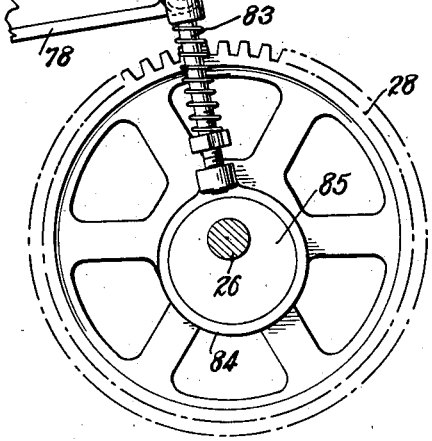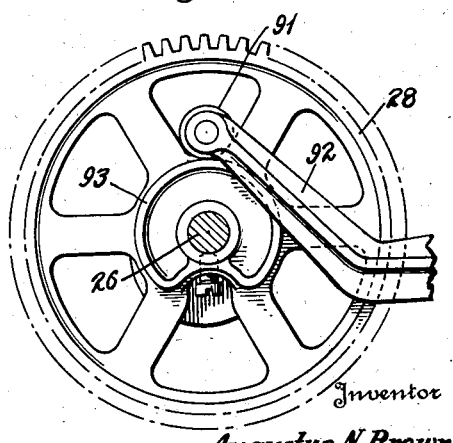

Patented Feb. 5, 1935

1,990,112

UNITED STATES PATENT OFFICE 1,990,112

GIN SAW GUMMING AND FILING MACHINE

Augustus N. Brown, McDonough, Ga.

Application September 5, 1933, Serial No. 688,245

10 Claims. (Cl. 76—31)

The invention relates to gin saw gumming machines and has as an object the provision of a simple portable machine operable to gum a plurality of saws of a gin assembly at a single operation.

It is a further object of the invention to provide a machine which may be either power or hand operated.

It is a further object of the invention to provide a machine using rotary files for removing the burr from the sides of the teeth to leave them in substantially the condition of new saws.

It is a further object of the invention to provide a rotary file for use in the machine of the invention.

Further objects of the invention will appear from the following description when read in connection with the accompanying drawings showing an illustrative embodiment of the invention and wherein:

Fig. 1 is a side view;

Fig. 2 is a vertical section on line 2—2 of Fig. 3, seen in the direction of the arrow, on an enlarged scale;

Fig. 3 is a plan view;

Fig. 4 is a detail section on line 4—4 of Fig. 1 upon an enlarged scale;

Fig. 5 is a detail vertical section on line 5—5 of Fig. 4;

Fig. 6 is a detail vertical section on line 6—6 of Fig. 5;

Fig. 7 is an end view of the gumming files viewed on line 7—7 of Fig. 3;

Fig. 8 is a vertical transverse section on line 8—8 of Fig. 3 with parts omitted;

Figs. 9 and 10 are detail vertical sections on lines 9—9 and 10—10 respectively of Fig. 3, viewed in the direction of the arrows, and drawn on an enlarged scale.

As shown the device comprises a support 11 comprising spaced legs 12, 13 as seen in Fig. 3, pivoted to the frame of the device as at 14, the lower ends of the said legs, not shown, adapted to rest upon the floor adjacent the ginning machine. The device is thus adapted to operate upon the saw of a ginning machine without removal of the saw from the machine by merely opening the case covering of the saw and by bringing the device to position to operate upon the saw in situ.

The frame of the machine comprises a pair of right and left-hand frame members 15, 16, similar except as to their forward ends to be described, spaced apart at their rearmost ends adjacent the pivot 14 and converging toward each other to be bolted together as at 17, Fig. 4, and from this point continued in contact to the point 18, from which point they are spaced apart to pass upon each side of one of the saws 19 of the gin saw.

Each of the frame members 15, 16 is shown as provided with an upright 20, 21 and a second upright 22, 23, backwardly sloping to join the uprights 20, 21 at bearings 24, 25, in which bearings is journalled a shaft 26. Upon the shaft 26 are keyed gears 27, 28, 29 for drive of the separate gumming files. The gear 28 is shown in mesh with the gear 29' keyed upon a shaft 30 mounted in bearings in the frame members 15, 16 upon one end of which is mounted a belt pulley 31, which may be driven by belt 32 from the motor 33 carried by a bracket 34 supported upon the legs 12 and 13.

The gumming files shown as three in number at 35, 36, 37 are shown as rigidly mounted upon the ends of shafts 38, 39, 40, each mounted in an arm 41, 42, 43, pivoted in yokes carried by a cross member 44 shown in detail in Fig. 8, the yokes comprising upward projections 45—50. The shafts 38—40 are slidable in the bearings 51, 52, 53 in the ends of the arms and in revoluble sleeves 54, 55, 56 shown in detail in Fig. 2, the said sleeves revolving in bearings 57, 58, 59 carried by the rear end of the arms 41—43. As shown in Fig. 2, the sleeves 54—56 each have a collar 60 fastened to their front ends and are formed with bevel gears 61, 62, 63 at their rear ends, the said bevel gears being each in mesh with one of the gears 64, 65, 66, each secured upon a separate sleeve 67, 68, 69 revolving upon shafts 70 fixed in the rear ends of the arms 41, 43. Mounted upon the sleeves 67, 68, 69 midway between the ends of the arms are gears 71, 72, 73 in mesh with the gears 27, 28, 29.

To urge the gumming files to a central position but to allow yielding thereof in both directions therefrom, there is shown a collar 74 fixed in a central position upon each of shafts 38, 39, 40 and urged to the central position by a pair of compression springs 75, 76, as clearly shown in Fig. 2.

Projecting upwardly and rearwardly from each of the bearings 57, 58, 59, is an arm 77, 78, 79 formed with a bearing 80, shown in detail in Fig. 9, in which is pivoted an arm 81 carrying a sleeve 82 in which is slidably mounted a rod 83 having fixed upon its lower end a ring 84 surrounding an eccentric 85 fixed upon shaft 26. When the shafts 38, 39, 40 are revolved to drive the files 35, 36, 37, the shaft 26 is being driven at a lower speed and after a certain number of revolutions of the files, the arms 41, 42, 43 are oscillated about their pivotal points in their bearings 45—50 to raise the files over a tooth already acted upon to allow the saws to be turned about their shaft 86, for operation upon the next tooth.

To cause movement of the saws about the shaft 86 there is shown an arm 87 pivoted upon the upright 88 bearing the cross-head 44, which upright 88 is fixed by means of a bolt 89 upon the frame members 15, 16 as shown in Fig. 1.

The arm 87 carries at its forward end a hook 90 which by oscillation of the arm 87 is raised and lowered in time with the vertical oscillation of the files. The downward or feeding movement of the hook member 90 is produced by a roller 91 carried by the rearwardly projecting portion 92 of the arm 87, as shown in Fig. 10, the roller 91 being actuated by a cam 93 formed upon the hub of the gear 28. The forward or non-feeding motion of the hook member 90 is produced by tensile spring 94 secured to the forward end of the arm 87 and to a member 95 secured upon the forward end of the arm 42.

To prevent chattering of the saws under action of the gumming files, the member 95 and also the members 96 and 97 likewise mounted upon the arms 41 and 43 are each formed with an arm 98 projecting to a position in advance of the file and provided with a sidewise terminus 99 to stand closely adjacent the saw, desirably in contact therewith.

To hold the frame in position upon the core 100, so as to locate the machine for action upon the saws, the forward end of the frame member 15 is provided with a yoke 101 attached at 102 and 103 to the frame member by set screws working in slots by means of which the yoke may be adjusted vertically and horizontally, the ends of the yokes being provided with pivoted shoes 104, 105 to contact the core 100.

The frame member 16 is shown as formed with a yoke 106 pivoted at 107 to an upward projection 108 carried by the end of the frame member, the member 106 projecting below the pivot and being pivotally connected at 109 to a rod 110 sliding through a flange 111 carried by the frame member, against which flange bears a compression spring 112 anchored against a nut 113 threaded upon the rod 110, by which means the pivoted shoe 114 carried by arm 106 is pressed upon the core 100.

The yoke 101 and the arm 106 are adapted to stand upon opposite sides of the central saw to be operated upon at any given time.

To remove the burr produced by the gumming operation upon the sides of the teeth, there are shown pairs of circular files 115 shown in detail in Fig. 6 as comprising discs bearing file teeth 116 arranged in annular series upon the sides with a central plain disk 117 adjacent the center thereof. By this arrangement the plain portions 117 which are raised above the file teeth prevent the files approaching each other under influence of compression springs 118 bearing upon the exterior of the files and anchored against member 119 carried by the shaft 120 from approaching so closely together as to thin the teeth of the saw.

The shaft 120 is shown as square in cross section and as provided with rounded portions 121 revoluble in sleeves 122 fixed in the ends of arms 123, 124, the rearward ends of which arms are secured by a bolt 125 to the frame members 15 and 16 and an intermediate portion of the arms being fixed upon horizontal members 126, 127 of angles 128, 129, the vertical members of which are clamped in split bearings 130, 131 carried by the frame members 15, 16. The arms 123, 124 are shown as integrally connected by means of cross members 132, 133. The arms 123, 124 and cross members 132, 133 constitute a sub-frame adjustable on the frame 15, 16 to carry the burr files 115.

To drive the shaft 120 there is shown a belt pulley 134 driven by belt 135 from pulley 136 secured upon shaft 30. The shaft 30 is driven at a considerable increase in speed over that of the shaft 26 by virtue of the difference in size of the gears 29 and 28. Advantage is taken of this fact to provide a hand drive for the device by placing a crank 137 upon the shaft 26 and a belt pulley 31 upon the shaft 30 which may be driven by the motor 33 and belt pulley 31 may be omitted and the device may be used wholly as a hand driven device using the crank 137, or the crank 137 may be used only for convenience in slow operation of the machine during its adjustment, after which it may be removed and the motor 33 may be depended upon for drive.

To make the machine useful with gin saws of different diameters and of different spacing of teeth, adjustments are provided. When the device is to be used upon a saw of smaller diameter than that for which it is shown as adjusted in Fig. 1, the arm 88 may be lowered by placing the bolt 89 in the hole 138 shown in Fig. 1 and by moving upwardly the vertical arms 128, 129 by loosening the split clamps 130, 131.

As shown the device is operable upon a tooth central in the machine and upon the fourth tooth each side thereof. The central arm 42 is shown in Fig. 8 to be mounted in fixed position in bearings 47, 48. If the spacing of the teeth differs from that shown, one or more of the washers 139 and 140 may be moved from the position shown in Fig. 8 to the other side of the arm bearing, so as to bring the outside files 35 and 37 the thickness of either one, two or three washers nearer the file 36. For adjustment of spaces less than the thickness of a washer, the bearings of arms 41 and 43 may be tilted in the projections 45, 46, and 49, 50 by loosening and tightening screws 141 and 142, the amount of this necessary adjustment being so slight that the mesh of the gears 71 and 27 and the gears 73 and 29 will not be seriously impaired.

The files 35, 36, 37, are, as indicated in Fig. 1 formed convex upon one side and concave upon the other side so as to preserve the shape of tooth shown in said figure upon the saw, which is the most efficient form of tooth for gin saw use. This shaped file in coaction with the side files 115, which remove the burr without thinning the teeth, enable the machine to keep the saws in substantially factory condition.

When teeth are bent laterally to any great extent, it is necessary to bend them back prior to operation of the machine thereon.

Minor changes may be made in the physical embodiment of the invention within the scope of the appended claims without departing from the spirit thereof.

I claim:

1. A gin saw gumming machine comprising in combination: a frame; means to support one end of said frame upon the core of a gin saw assembly; a support carried by said frame; a plurality of arms oscillatably mounted upon said support; a shaft longitudinally and rotatably mounted upon each arm; a disc file secured upon the end of each shaft; means to rotate said shafts; means to oscillate said arms; means to feed the saw assembly tooth by tooth in synchronism with said oscillation; an arm mounted on said support; a shaft carried by said last named arm; a plurality of pairs of rotary files mounted to rotate with the last named files in contact with opposite sides of teeth treated by said first named files; means to drive said last named shaft; and means to adjust said support and said last named arm transversely of said frame to act upon saws of differing diameters.

2. A gin saw gumming machine comprising, in combinaiton: a frame; means mounted on the frame to simultaneously file the teeth of saws of an assembly; a shaft mounted transversely of the frame; a plurality of pairs of disc files slidably mounted on said shaft to rotate therewith; an abutment adjustably secured upon said shaft upon each side of each pair of files; compression springs acting against said abutments and against the outer surface of each file of each pair to press the files against the sides of saw teeth.

3. A gin saw gumming machine comprising, in combination: a frame; means to support an end of said frame upon the core of a gin saw assembly; a support mounted on said frame having a bar extending transversely of the frame; an odd number greater than one of arms, the central arm of said plurality oscillatably mounted in fixed bearings upon said bar, the remaining of said arms oscillatably mounted upon said bar for lateral adjustment whereby to space said arms in accordance with the spacing of individual saws of different saw assemblies; a shaft rotatably and longitudinally mounted upon each arm; a rotary file secured upon the end of each shaft; means to oscillate said arms to bring said files into contact with and to clear teeth of said saws; means to rotate the saw assembly tooth by tooth in synchronism with such oscillation; and means to cause rotation of said file bearing shafts.

4. A file for removing the burr from the sides of gin saw teeth comprising a circular disc having substantially parallel opposite faces and a central raised portion; file teeth extending from the periphery of said raised portion substantially radially to the perimeter of the disc.

5. A file for removing the burr from the sides of gin saw teeth comprising a circular disc having substantially parallel opposite faces and a raised central portion on each side thereof; file teeth extending substantially radially from the perimeter of said raised portion to the perimeter of the file upon each face thereof.

6. A gin saw gumming machine comprising, in combination: a frame; a central vertically oscillatable shaft journalled in a fixed position on said frame; a plurality of lateral vertically oscillatable shafts journalled on said frame for lateral adjustment on the frame relative to said central shaft; the number of said lateral shafts symmetrical on each side of said central shaft; means to adjust the position of said lateral shafts; a gumming file carried by each shaft; and means to revolve said shafts.

7. A gin saw gumming machine comprising, in combination: a frame; a plurality of arms each oscillatable in spaced bearings carried by said frame; means to adjust said arms transversely of the frame comprising washers insertable at will at either side of said arms between said bearings upon the pivotal means of said arms; a shaft longitudinally journaled in each said arm; a gumming file carried by each shaft, and means to rotate said shafts.

8. A gin saw gumming machine comprising, in combination: a frame; at least three pairs of spaced bearing members carried by said frame; an arm having projecting stub shafts oscillatable in each pair of bearings; the central of said arms fitting closely between its bearings; the remaining arms of less width than the spacing of the pair of bearings for each; washers placed at will upon either of the stub shafts of said remaining arms to adjust the transverse position of the said remaining arms on the frame; a shaft longitudinally journalled in each arm; a gumming file mounted on each shaft; and means to rotate said shafts.

9. A gin saw gumming machine comprising, in combination: a frame; at least three pairs of spaced bearing members carried by said frame; an arm having projecting stub shafts oscillatable in each pair of bearings; a shaft journalled longitudinally in each arm; a gumming file mounted on each arm; the arms at each side of the central arm fitting loosely between their respective bearing members; means to adjust the stub stafts of the last named arms in their bearings whereby to adjust their carried files laterally of the frame; and means to revolve said longitudinal shafts.

10. A gin saw gumming machine comprising, in combination: a frame; means to support an end of said frame upon the core of a gin saw assembly; means carried by said frame to sharpen the teeth of a saw of said assembly; a sub-frame mounted on said frame; a shaft rotatably mounted transversely upon said sub-frame; a pair of disk files carried by said shaft to operate upon opposite sides of the teeth of a saw under treatment by said sharpening means; means to rotate said shaft and files; and means whereby to adjust said sub-frame both vertically and longitudinally on the frame to register said files with the teeth of saws of different diameters.

AUGUSTUS N. BROWN.